Aug. 28, 1934.    E. G. McDONALD    1,971,616
BRAKE
Filed Aug. 8, 1930
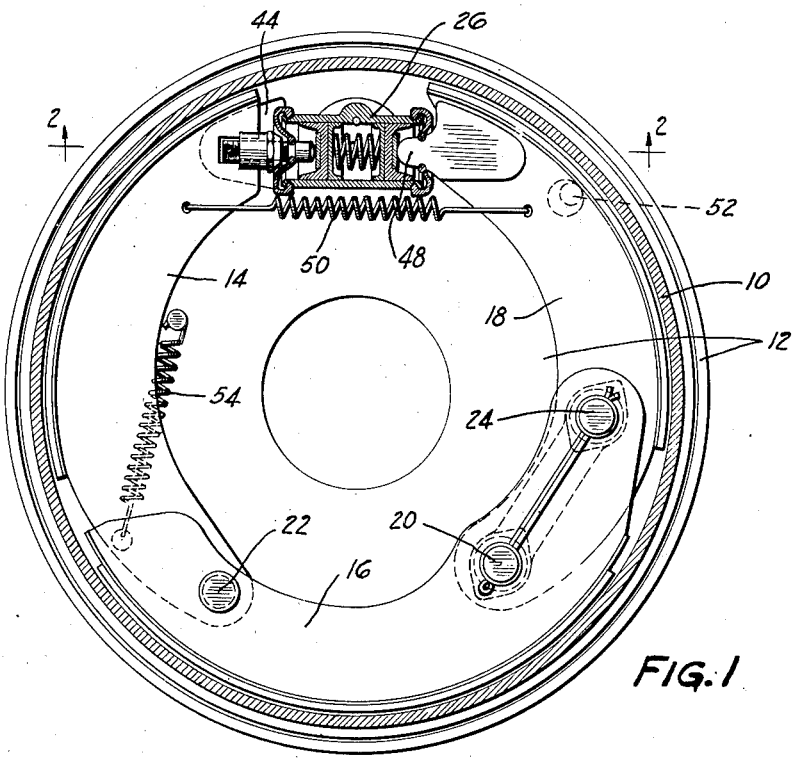
FIG. 1
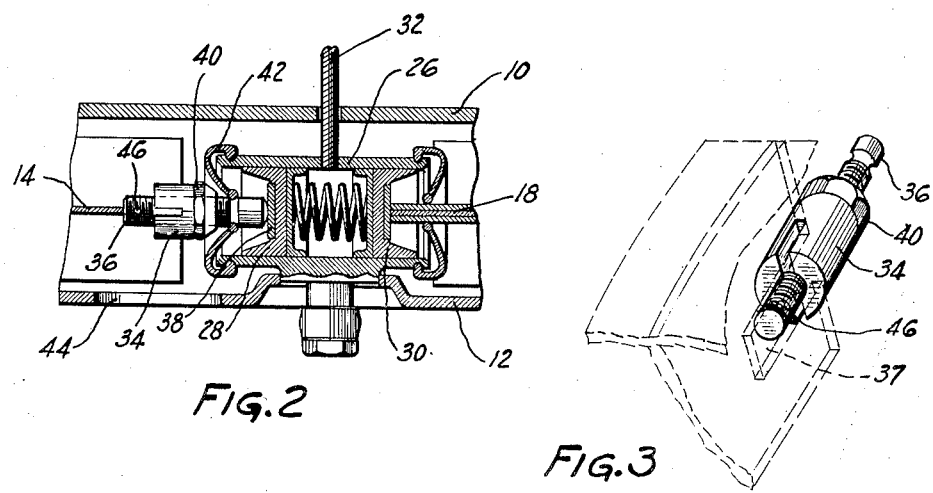
FIG. 2
FIG. 3
INVENTOR
EUGENE G. McDONALD
BY H. O. Clayton
ATTORNEY Patented Aug. 28, 1934

1,971,616

UNITED STATES PATENT OFFICE 1,971,616

BRAKE

Eugene G. McDonald, South Bend, Ind., assignor to Bendix Brake Company, South Bend, Ind., a corporation of Illinois Application August 8, 1930, Serial No. 473,841

5 Claims. (Cl. 188—79.5)

This invention relates to brakes in general and more particularly to automotive brakes of the internal expanding type.

Such brakes usually employ, as the friction elements thereof, brake shoes, each pivotally mounted, at one end, to either another shoe or to the brake support plate and, at the remaining end, constructed to receive the thrust of a cam or equivalent applying means. In normal service the brake lining of the shoe wears away, thereby increasing the clearance between the shoe and the brake drum in "brake off" position. This clearance may increase to a degree such as to materially lower the efficiency of the brake. It is therefore the principal object of the invention to provide a simple and effective adjustment for the friction element of the brake to compensate for this objectionable clearance.

In one desirable arrangement, I have provided a thrust member disconnectedly engaging one end of one of the friction elements, preferably the applying end, which member is sleeved upon an adjusting element the latter receiving the thrust of the applying means and also being provided with means engageable with the thrust member to transmit the applying thrust thereto.

Other features of the invention including particular details of construction and combinations of parts will become apparent from the following description of a preferred embodiment thereof which embodiment is disclosed in the accompanying drawing, in which:

Figure 1 is a side elevation of the brake parts disclosing in detail my novel adjusting means, Figure 2 is an enlarged detail of the adjusting means and applying means cooperating therewith, which section is taken on line 2—2 of Figure 1, and Figure 3 is a view in perspective, of parts of the adjusting means.

Describing now in detail a preferred embodiment of my invention, there is disclosed in Figure 1, a conventional rotatable brake drum 10 secured to the wheel of the vehicle (not shown) and which drum is closed at its open end by the usual brake support or backing plate 12 secured to an unsprung portion of the chassis. Mounted on the brake support plate 12 are three interconnected brake shoe elements, 14, 16 and 18. The particular arrangement and structure of these friction elements constitutes no part of this invention being more fully described and claimed in Patent No. 1,659,545 issued February 14, 1928. Preferably however, the brake includes the shoe elements 14 and 18, element 18 being pivotally mounted on an anchor pin 20 and element 14 pivotally secured at 22 to so-called auxiliary shoe element 16, the latter pivotally secured to the brake support plate at 24.

The friction elements 14 and 18 are spaced apart at their upper ends to receive an applying means, which preferably comprises a fluid motor the cylinder 26 of the motor being rigidly mounted on the backing plate and containing similar and oppositely movable pistons 28 and 30, a conduit 32 supplying the pressure fluid to the chamber formed between the pistons, which fluid when placed under pressure serves to thrust the pistons apart in a conventional manner.

The principal object of my invention is to provide the brake shoes with an adjusting structure preferably adjacent the fluid motor or equivalent applying means. This adjusting structure may comprise a short tubular thrust member 34 slotted at one end to receive the web of the friction element 14 which thrust member is somewhat loosely sleeved upon a threaded bolt member 36, the latter being in disconnected thrust engagement at one of its ends with a thrust plate member 38 fitting within a recess in the piston 28. At its other end the bolt 36 is received within a slot 37 in the web of the shoe. The bolt 36 threadedly receives an adjusting thrust nut 40 adapted to abut the tubular thrust element 34 to transmit the brake applying thrust nut 40 adapted to abut the tubular thrust element 34 to transmit the brake applying thrust from the piston through the bolt, nut and thrust element to the brake shoe. A rubber boot 42 of conventional form and texture may be mounted on the end of the cylinder 26, said boot receiving, through an opening in its center, the adjusting bolt 36.

The brake support plate 12 is also preferably recessed at 44 opposite the adjusting means to render access thereto and the bolt 36 at its end is provided with openings 46 to accommodate a tool to rotate the bolt.

The end of friction element 18 opposite the adjusting means just described is preferably provided with a nose portion 48 on its web, corresponding to the bolt 36 of the adjusting means. It is obvious however, that the adjusting means just described may be duplicated on shoe 18. A return spring 50 connected to the webs of the friction elements 14 and 18 functions to draw the same out of drum contact and into engagement with the applying means and an adjustable stop 52, respectively. A return spring 54 is also preferably secured to the intermediate shoe 16 and to the backing plate, also serving to maintain the connected shoes 14 and 16 in their brake-off position against the applying means.

In operation, pressure applied to the brake fluid from the conventional master cylinder (not shown) acts on the pistons to force the brake shoes into drum engagement, resulting in a certain wear of the lining thereof. In order to compensate for this wear and maintain a constant clearance between the friction elements and the drum, in "brake off" position, there is provided the adjusting means heretofore described, which is operated as follows:

Rotation of the bolt 36 by means of a suitable tool from outside the brake support plate imparts relative movement between the bolt and thrust nut 40, the latter in disconnecting engagement with the thrust element 34 and non-rotatably held during this operation. The friction of the parts of the applying means together with the resistance to flexation of the boot 42 obviates bodily movement of the bolt during this adjustment. The relative movement of the bolt and nut parts effects an outward radial movement of the brake shoe 14 decreasing the clearance of the pivotally connected shoes 14 and 16. A very simple adjusting means is thus provided, the operation of which may be readily effected without removal of the wheel or brake by virtue of the opening in the backing plate.

While I have illustrated and described somewhat in detail one embodiment of my invention, it is not my intention to limit the scope of the invention to this particular embodiment or otherwise than by the terms of the appended claims.

I claim:

1. A brake structure comprising in combination a friction element, a rotatable drum housing said element, and means for pre-determining the clearance between said drum and friction element in "brake off" position, said means including a thrust member engaging one end of said element, an adjustable member sleeved within said thrust element and means on said adjustable member abutting said thrust member.

2. A brake structure comprising in combination, a friction element, a rotatable drum housing said element, and means for pre-determining the clearance between said drum and friction element in "brake off" position, said means including a slotted thrust member, the slotted portion thereof engaging one end of said element, an adjustable bolt member sleeved within said thrust member, and an adjustable means on said bolt member abutting said thrust member.

3. Adjusting means for a brake friction element, said element having a slot in the end of a web portion thereof, comprising in combination, a bolt received within said slot, a thrust member sleeved over said bolt, said member slotted to receive the web of the friction element together with an adjusting nut threaded on said bolt and in thrust engagement with said thrust member.

4. Adjusting means for a brake friction element, said element having a slot in the end of a web portion thereof comprising in combination, a bolt received within said slot, a thrust member associated with said bolt and slotted to receive the web of the friction element.

5. Adjusting means for a brake friction element wherein the element has a web portion comprising in combination, a bolt associated with said element, and a thrust member having a bore extending from end to end through which said bolt extends and slotted to receive the web of the friction element.

EUGENE G. McDONALD.